United States Patent Office 3,496,278
Patented Feb. 17, 1970

3,496,278
POLYBUTENES AND THEIR UTILIZATION AS MITICIDES AND INSECTICIDES
Gustave K. Kohn, Berkeley, and Arthur A. Whipp, Walnut Creek, Calif., assignors to Chevron Research Company, San Francisco, Calif., a corporation of Delaware
No Drawing. Filed Aug. 30, 1967, Ser. No. 664,249
Int. Cl. A01n 9/00
U.S. Cl. 424—355  4 Claims

ABSTRACT OF THE DISCLOSURE

Methods for controlling insects and acari in which a polyisobutene having a 10 to 90% distillation range at 10 mm. Hg between about 300° F. and about 465° F. and a 50% distillation point in the range of about 360° F. and about 395° F. is applied in toxic amounts to the pests, their ova or environment.

FIELD OF INVENTION

This invention concerns novel methods for controlling acari and insects. More specifically, it is directed to controlling acari and insects by applying toxic amounts of a specific polybutene fraction to the acari and the insects.

INVENTION BACKGROUND

Various petroleum oils have been used for many years to control arthropod pests which attack vegetation. These oils are applied as emulsions directly to the infested vegetation in amounts which are toxic to the pests. These oils are known to be harmful to plant foliage and are thus usually applied to the vegetation during its dormant period. Only certain oils, normally those which have been treated to remove or alter unsaturated components in the oil, are safe enough to apply directly to plant foliage. And, even with these treated oils, repeated foliar applications are not recommended.

Workers in the pesticide art have also investigated polybutenes as acaricides and insecticides. These workers generally favored higher molecular weight tacky polybutenes. These tacky materials produce a "fly paper" effect and were reported as being more effective than lower molecular weight polybutenes. Work with the tacky polybutenes was discontinued because they were excessively phytotoxic when applied repeatedly to plant foliage.

INVENTION DESCRIPTION

It has now been discovered that a certain polybutene fraction of lower viscosity and higher homogeneity than the previously used polybutenes has unexpectedly high acaricidal and insecticidal activity without appreciable phytotoxicity. These results are especially surprising in view of the high unsaturation present in this polybutene fraction and the phytotoxicity of the previously used polybutenes.

The specific polybutene fraction which is used in this invention has a 10 to 90% distillation range at 10 mm. Hg between about 300° F. and about 465° F. and a 50% distillation point in the range of about 360° F. and about 395° F. A preferred fraction has a 10 to 90% distillation range at 10 mm. Hg of about 310° F. to 450° F. and a 50% distillation point of about 360° F. to 375° F. The closest of the previously used polybutenes had a 10 to 90% distillation range at 10 mm. Hg of about 230° F. to 605° F. Thus, the fraction used in this invention is substantially more homogeneous than the art polybutenes. The viscosity of this unique polybutene fraction is lower than that of the previously used polybutenes and is about 36 to 38 SSU at 210° F.

The specific polybutene cut which is used in this invention may be derived from the polymer prepared by polymerizing a feed stock consisting essentially of isobutene according to conventional methods involving Friedel-Crafts type catalysts. This polymer product is non-crystalline and non-stereoregular. Such polymerizations are normally carried out at about 75 to 120° F., preferably 90 to 110° F., in the presence of aliphatic hydrocarbon solvents such as propane, butane, isopentane and heptane or halogenated hydrocarbon solvents. Friedel-Crafts type catalysts comprise a principal catalyst which is usually a halide of a Group II to IV metal such as aluminum chloride, aluminum bromide, titanium tetrachloride, boron trifluoride and stannic chloride or a halide of a higher group metal such as ferric chloride with a cocatalyst such as an alkyl halide, hydrochloric acid, water or other substance which gives rise to protons or carbonium ions. The weight ratio of principal catalyst to cocatalyst may vary widely. Usually it is in the range of about 1:1 and 10:1.

The fraction may be isolated from the total product of the polymerization by distillation. This distillation is carried out by conventional means and procedures. Preferably it is done at subatmospheric pressures to increase yields and minimize the chances of thermally decomposing the polymer.

The polybutene fraction will normally be formulated initially as a concentrated aqueous emulsive comprising the fraction and a suitable surfactant. Nonionic surfactants are preferred in such emulsives. These surfactants are exemplified and described in Surface Active Agents and Detergents, Schwartz, Perry and Berch, Interscience Publishers (1958). The emulsive will be about 90 to 98% by weight polybutene and about 2 to 5% by weight surfactant. For application to insects, acari, their ova or vegetation which is invested with such pests, the emulsive will be diluted with water to form an emulsion. About 1 to 2 gal. of polybutene fraction per 1000 gal. water will normally be used.

The above described formulations may also contain solvents for the polybutene such as xylene, kerosine and diesel oil, and other pesticides such as DDT, O,O-dimethyl - O - p - nitrophenyl phosphorothioate, 1,2-dibromo-2,2 - dichloroethyl dimethylphosphate, p - chlorophenyl-2,4,5 - trichlorophenyl sulfone, 2 - (1-methyl-n-heptyl)-4,6-dinitrophenyl crotonate, etc.

EXAMPLES

The following examples illustrate the methods for controlling insects and acari of this invention and their unexpected superiority over other polybutene fractions. These examples are offered only to illustrate the invention described and claimed herein and are not meant to limit it in any way. Unless otherwise indicated percentages are by weight.

Example 1

Acaricidal activities of a polybutene fraction within this invention (A) and two comparison polybutene fractions (B and C) were determined in side-by-side testing using the following general procedure.

Actone solutions of each fraction were dispersed in water containing a small amount of a nonionic surfactant at various concentrations. Sets of three replicate mite-(Tetranychus telarius L.) infested sections of fresh lima bean leaves having at least 20 mites per section were dipped in these aqueous emulsions and then placed on dishes to dry. The dry sections were incubated at 75° F. for 24 hours. Mortality counts were then made on 20 randomly counted mites per replicate. The results of these tests, expressed as the $ED_{50}$'s (effective dosage required to give 50% kill) of each fraction, appear in Table I.

TABLE I

| | Polybutene Fraction | | Percent morality, $ED_{50}$ (p.p.m.) |
|---|---|---|---|
| | 10-90% distillation range at 10 mm. Hg (° F.) | 50% distillation point at 10 mm. Hg (° F.) | |
| A | 310-442 | 365 | 975 |
| COMPARISON | | | |
| B [1] | [2] 230-604 | 350 | 1,830 |
| C | 292-470 | 365 | 1,820 |

[1] Indapol L-10 (Standard Oil Co. of Indiana).
[2] Cracking.

Example 2

Fractions A and C of Example 1 were tested as acariovicides as follows: Aqueous emulsions of the fractions were prepared as in Example 1. Sets of three replicate sections of lima bean leaves on which mite-(*Tetranychus telarius* L.) eggs (at least 20 per section) were present were dipped in the emulsions and then placed on dishes to dry. The dry sections were incubated for two weeks at 75° F. Mortality counts were then made on 20 randomly counted eggs per section. The $ED_{50}$'s for each fraction were: A—360 p.p.m.; C—670 p.p.m.

Example 3

Fractions A and C of Example 1 were also tested as acaricides by a foliar spray method. In this method aqueous emulsions of the fractions were prepared as in Example 1. An atomized spray of each emulsion was sprayed on 3 replicate mite-(*Tetranychus telarius* L.) infested pinto bean plants at 100 gal./acre. After the sprayed plants dried, they were placed in a greenhouse for 24 hrs. Mortality counts were then made on 20 mites per replicate. The $ED_{50}$'s for each fraction were: A—1050 p.p.m.; C—2300 p.p.m.

The methods of this invention were also used to control citrus red mite on oranges, cabbage looper on lettuce and European red mites on apples. No phytotoxic effects were observed from using the method of this invention in Example 3 or any of the above-mentionel applications.

What is claimed is:

1. Method for controlling cabbage looper which comprises applying a toxic amount of polyisobutene having a 10 to 90% distillation range at 10 mm. Hg of about 300° F. to about 465° F. and a 50% distillation point in the range of about 360° F. to about 395° F. to the cabbage looper.

2. The method of claim 1 wherein the 10 to 90% distillation range is about 310° F. to about 450° F. and the 50% distillation point is in the range of about 360° F. to 375° F.

3. Method for controlling mites selected from the group consisting of red spidermites, citrus red mites and European red mites which comprises applying a miticidally effective amount of polyisobutene having a 10 to 90% distillation range at 10 mm. Hg of about 300° F. to about 465° F. and a 50% distillation point in the range of about 360° F. to about 395° F. to said mites.

4. The method of claim 3 wherein the 10 to 90% distillation range is about 310° F. to about 450° F. and the 50% distillation point is in the range of about 360° F. to 375° F.

References Cited

J. of Economic Entomology, Fisher, R. W. Polybutenes-A New Control for Phytophagous Mites vol. 52 p. 1015 (1959).

ALBERT T. MEYERS, Primary Examiner
V. D. TURNER, Assistant Examiner

U.S. Cl. X.R.
424—83